US011775736B2

(12) United States Patent
Goo et al.

(10) Patent No.: US 11,775,736 B2
(45) Date of Patent: Oct. 3, 2023

(54) METHOD AND SYSTEM FOR PROVIDING MINI-MAP IN CHATROOM

(71) Applicant: LINE Plus Corporation, Seongnam-si (KR)

(72) Inventors: Sangmo Goo, Seongnam-si (KR); Min Hwang, Seongnam-si (KR); Yubin Kim, Seongnam-si (KR); Jihun Im, Seongnam-si (KR); Jay Lee, Seongnam-si (KR); Yeon Jin Jin, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/583,627

(22) Filed: Jan. 25, 2022

(65) Prior Publication Data

US 2022/0237365 A1     Jul. 28, 2022

(30) Foreign Application Priority Data

Jan. 28, 2021   (KR) .......................... 10-2021-0012511

(51) Int. Cl.
| | |
|---|---|
| *G06F 40/134* | (2020.01) |
| *G06F 16/34* | (2019.01) |
| *G06F 40/137* | (2020.01) |
| *G06F 40/109* | (2020.01) |
| *H04L 51/52* | (2022.01) |
| *G06F 3/0482* | (2013.01) |

(52) U.S. Cl.
CPC .......... *G06F 40/134* (2020.01); *G06F 3/0482* (2013.01); *G06F 16/345* (2019.01); *G06F 40/109* (2020.01); *G06F 40/137* (2020.01); *H04L 51/52* (2022.05)

(58) Field of Classification Search
CPC ..... G06F 3/0482; G06F 16/345; G06F 40/137
See application file for complete search history.

(56) References Cited

U.S. PATENT DOCUMENTS

| | | | | |
|---|---|---|---|---|
| 7,159,011 | B1 * | 1/2007 | Knight ................ | G06Q 10/107 |
| | | | | 707/E17.108 |
| 2006/0090137 | A1 * | 4/2006 | Cheng ................. | G06Q 10/107 |
| | | | | 715/758 |
| 2009/0319911 | A1 * | 12/2009 | McCann ............. | G06Q 10/107 |
| | | | | 715/752 |
| 2013/0086175 | A1 * | 4/2013 | Claux ................ | G06F 3/04842 |
| | | | | 709/206 |

(Continued)

FOREIGN PATENT DOCUMENTS

KR    10-2020-0047206 A    5/2020

*Primary Examiner* — Asher D Kells

(74) *Attorney, Agent, or Firm* — Harness, Dickey & Pierce, P.L.C.

(57) ABSTRACT

Disclosed is a method and system for providing a mini-map in a chatroom. A mini-map providing method including displaying a first portion in a sequence of contents included in instant messages sent and received through a session corresponding to a chatroom on a message display region of a screen for displaying the chatroom, displaying a second portion that includes the first portion in the sequence of contents on a mini-map display region on the screen for displaying the chatroom, and interacting with the message display region and the mini-map display region may be provided.

18 Claims, 11 Drawing Sheets

(56) References Cited

U.S. PATENT DOCUMENTS

| | | | |
|---|---|---|---|
| 2013/0125060 A1* | 5/2013 | Lee | G06F 3/048 |
| | | | 715/853 |
| 2013/0125061 A1* | 5/2013 | Lee | G06F 3/0482 |
| | | | 715/854 |
| 2013/0125063 A1* | 5/2013 | Lee | G06F 3/04883 |
| | | | 715/854 |
| 2014/0223347 A1* | 8/2014 | Seo | H04M 1/72436 |
| | | | 715/769 |
| 2016/0364368 A1* | 12/2016 | Chen | H04L 51/216 |
| 2019/0272085 A1* | 9/2019 | Radhakrishnan Lakshmi | |
| | | | G06F 3/0486 |
| 2021/0373749 A1* | 12/2021 | Fullerton | G06F 3/04842 |

* cited by examiner

METHOD AND SYSTEM FOR PROVIDING MINI-MAP IN CHATROOM

CROSS-REFERENCE TO RELATED APPLICATION(S)

This U.S. non-provisional application and claims the benefit of priority under 35 U.S.C. § 119 to Korean Patent Application No. 10-2021-0012511, filed Jan. 28, 2021, the entire contents of which are incorporated herein by reference in their entirety.

BACKGROUND

Technical Field

Some example embodiments relate to methods and/or systems for providing a mini-map in a chatroom.

Related Art

The term "chat room or chatroom" is generally used to describe all kinds of synchronous conferencing or asynchronous conferencing. The term "chatroom" may represent any technology ranging from real-time online chatting and online interaction with strangers, for example, an online forum, to a fully immersive graphical social environment.

The main purpose of such a chatroom is to share information with other user groups and users may share various types of information, for example, a text, an image, and a link, in the chatroom by sending and receiving instant messages.

Here, according to an increase in a number of instant messages sent and received through a session corresponding to a single chatroom, a number of contents included in the corresponding chatroom also increases. Therefore, it is difficult to retrieve desired content from among contents of instant messages previously sent and received among participants of the chatroom.

SUMMARY

Some example embodiments may provide mini-map providing methods and/or systems that may provide a mini-map for contents of instant messages sent and received through a session corresponding to a chatroom.

According to an aspect of at least one example embodiment, there is provided a mini-map providing method performed by a computer apparatus including at least one processor. The mini-map providing method includes, by the at least one processor, displaying a first portion in a sequence of contents included in instant messages sent and received through a session corresponding to a chatroom on a message display region on a screen for displaying the chatroom, displaying a second portion that includes the first portion in the sequence of contents on a mini-map display region on the screen for displaying the chatroom, and interacting with the message display region and the mini-map display region.

The interacting may include in response to changing the first portion displayed on the message display region, changing the second portion to include the changed first portion to be displayed on the mini-map display region, and in response to selecting a specific content or a subsequence of contents is selected from the second portion displayed on the mini-map display region, changing the first portion displayed on the message display region to include the selected content or subsequence of contents in the first portion.

A size of each content included in a subsequence of the second portion may be less than a size of each content included in a subsequence of the first portion.

The size of each content may include at least one of a length of text included in content, a font size of text included in the content, and a size of an image included in the content.

A number of contents included in a first subsequence of the second portion may be greater than a number of contents included in a second subsequence of the first portion.

The displaying on the mini-map display region may include modifying contents included in a subsequence of the second portion.

The mini-map providing method may further include, by the at least one processor, displaying a size of a display on which the screen is displayed. The modifying may include modifying the contents included in the subsequence of the second portion according to the size of the display.

The modifying may include reducing at least one of a font size and an image size of respective contents included in the subsequence of the second portion.

The modifying may include replacing an image with an icon or replacing the text with a summarized text, in the contents included in the subsequence of the second portion.

The modifying may include replacing contents included in the subsequence of the second portion with bookmarked contents or replacing the contents included in the subsequence of the second portion with a sequence of times at which instant messages corresponding to the contents are sent and received.

The mini-map providing method may further include, by the at least one processor, providing a bookmark setting function for contents included in a subsequence of the first portion, and in response to setting a bookmark to first content among the contents included in the subsequence of the first portion through the bookmark setting function, displaying the set bookmark through the first content included in a subsequence of the second portion.

The displaying a second portion may include setting a condition for at least one of a sending time range of an instant message, a sender of the instant message, and a content format, and distinguishing contents included in a subsequence of the second portion according to the set condition and displaying the distinguished contents on the mini-map display region.

The displaying a second portion may include setting a condition for at least one of a sending time range of an instant message, a sender of the instant message, and a content format, and filtering contents included in a subsequence of the second portion according to the set condition and displaying the filtered contents on the mini-map display region.

The mini-map providing method may further include, by the at least one processor, providing a user interface for setting the condition. The setting of the condition may include registering the condition selected or input through the user interface as a setting value.

The mini-map providing method may further include, by the at least one processor, switching the screen to a mini-map mode screen in response to a size of a display on which the screen is displayed being less than or equal to a first threshold or when a size of each content included in a subsequence of the second portion is less than or equal to a second threshold. The contents included in the subsequence of the second portion may be displayed on the mini-map mode screen.

The mini-map providing method may further include, by the at least one processor, displaying a mini-map mode screen on which contents included in a subsequence of the second portion are displayed in response to a user entering the chatroom, and displaying the screen on which a selected content is displayed and including the message display region and the mini-map display region in response to an elapse of a period of time or in response to a selection of at least one of the contents displayed on the mini-map mode screen by the user.

According to an aspect of at least one example embodiment, there is provided a non-transitory computer-readable record medium storing a program, which when executed by at least one processor included in a computer apparatus, causes the computer apparatus to perform the mini-map providing method.

According to an aspect of at least one example embodiment, there is provided a computer apparatus including at least one processor configured to execute a computer-readable instruction. The at least one processor is configured to cause the computer apparatus to display a first portion in a sequence of contents included in instant messages sent and received through a session corresponding to a chatroom on a message display region of a screen for displaying the chatroom, display a second portion that includes the first portion in the sequence of contents on a mini-map display region on the screen for displaying the chatroom, and interact with the message display region and the mini-map display region.

According to some example embodiments, it is possible to provide mini-map providing methods and/or systems that may provide a mini-map for contents of instant messages sent and received through a session corresponding to a chatroom.

Further areas of applicability will become apparent from the description provided herein. The description and specific examples in this summary are intended for purposes of illustration only and are not intended to limit the scope of the present disclosure.

DETAILED DESCRIPTION

Figure 1:
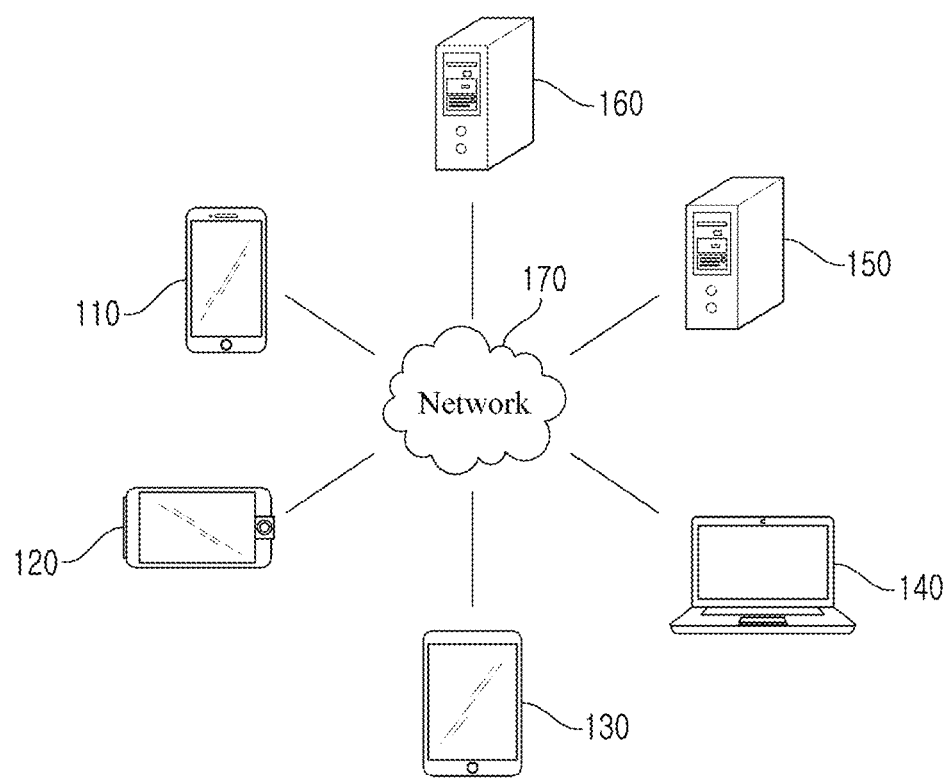
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device. However, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

A mini-map providing system according to some example embodiments may be implemented by at least one computer apparatus. Here, a computer program according to an example embodiment may be installed and run on the computer apparatus and the computer apparatus may perform a mini-map providing method according to some example embodiments under control of a computer program. The aforementioned computer program may be stored in a computer-readable record medium to implement the mini-map providing method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to some example embodiments and an environment applicable to example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, or a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include an instant messaging service, a social network service, a payment service, a virtual exchange service, a risk monitoring service, a game service, a group call service or an audio conference service, a messaging service, a mail service, a map service, a translation service, a financial service, a search service, and a content providing service.

Figure 2:
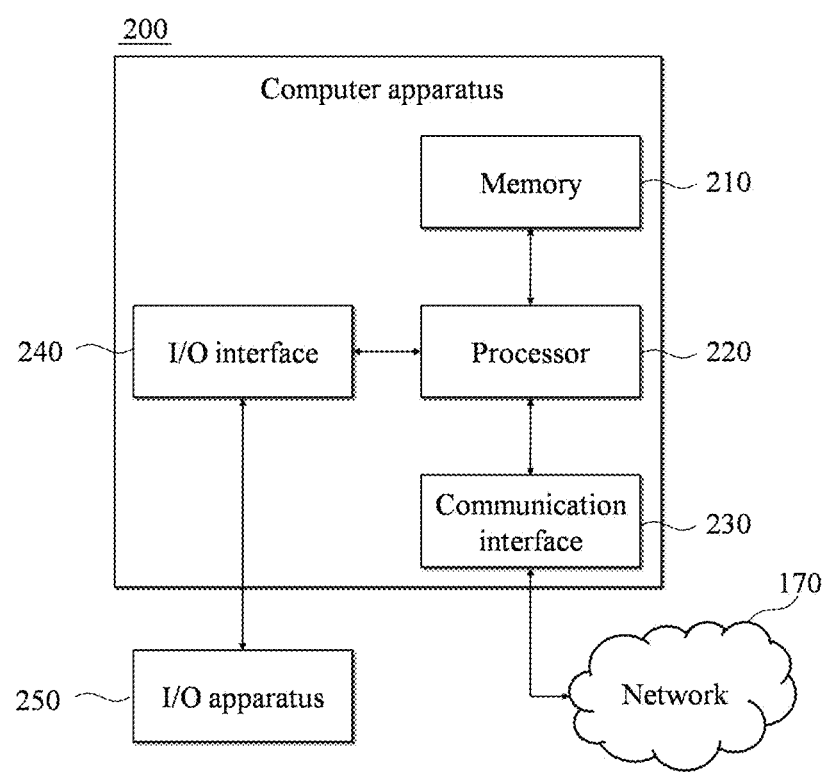
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interfacing with an I/O apparatus 250. For example, an input device may include a device, such as a microphone, a keyboard, and/or a mouse, and an output device may include a device, such as a display and/or a speaker. As another example, the I/O interface 240 may be a device for interfacing with an apparatus in which an input function and an output function are integrated into a single function, such as a touchscreen. At least one of the I/O apparatus 250 may be configured as a single apparatus with the computer apparatus 200. For example, a touchscreen, a microphone, a speaker, etc. of a smartphone may be included in the computer apparatus 100.

Also, according to other example embodiments, the computer apparatus 200 may include a greater or smaller number of components than the number of components of FIG. 2. However, there is no need to clearly illustrate most conventional components. For example, the computer apparatus 200 may be configured to include at least a portion of the I/O apparatus 250 or may further include other components, such as a transceiver and a database.

Although a mini-map generally refers to a reduced map of a place in progress in a game, the term "mini-map" used herein may refer to a user interface for reducing and displaying a sequence of contents included in instant messages sent and received through a session corresponding to a chatroom. Here, the sequence of contents may be based on order in which the instant messages are sent and received.

A chatroom including the mini-map may be provided to a user through the computer apparatus 200 of FIG. 2. Here, an application may be installed and run on the computer apparatus 200 as a computer program linked with an instant messaging service, and the computer apparatus 200 may provide the chatroom including the mini-map and the following functions through communication with a server, for example, the server 150, that provides the instant messaging service under control of the application.

Figure 3:
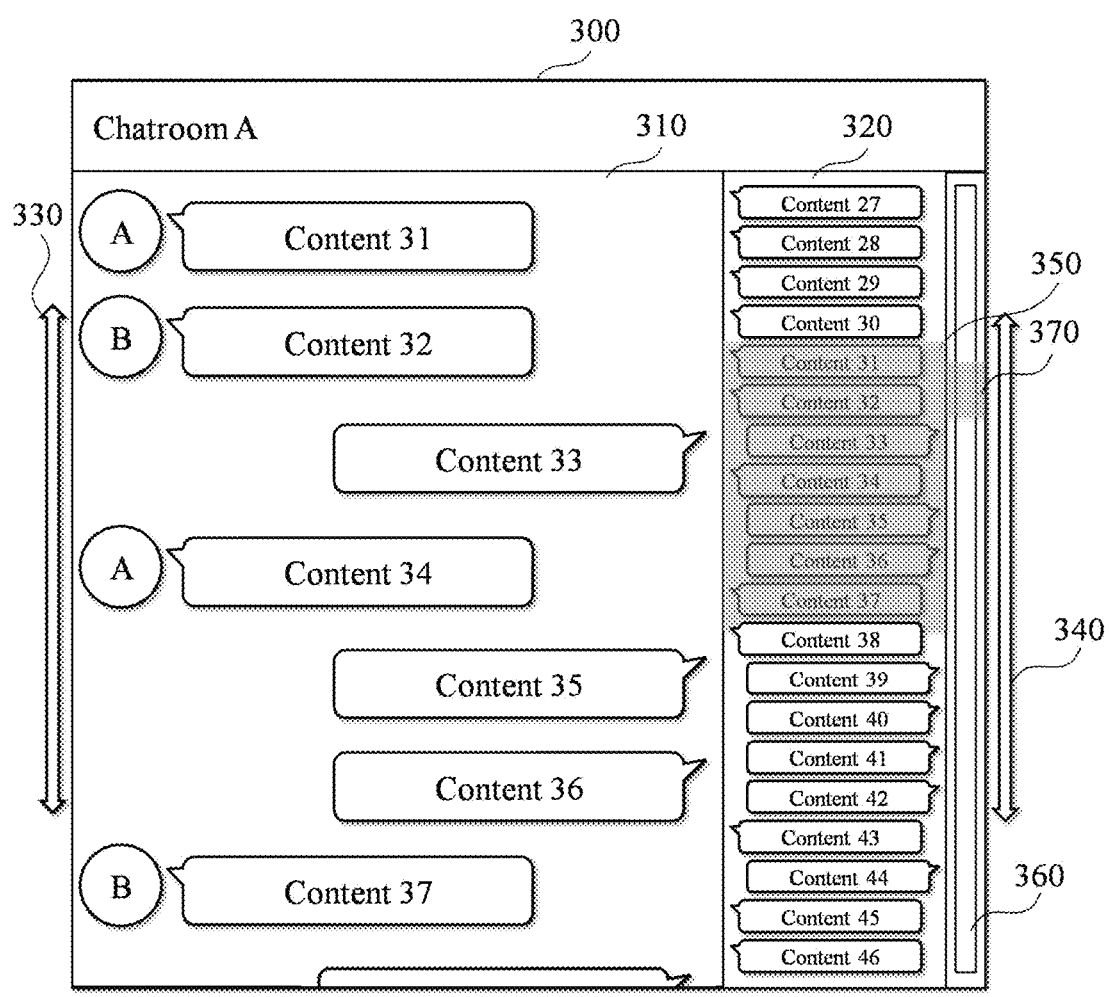
FIGS. 3 and 4 illustrate examples of a chatroom including a mini-map according to at least one example embodiment.
Figure 4:
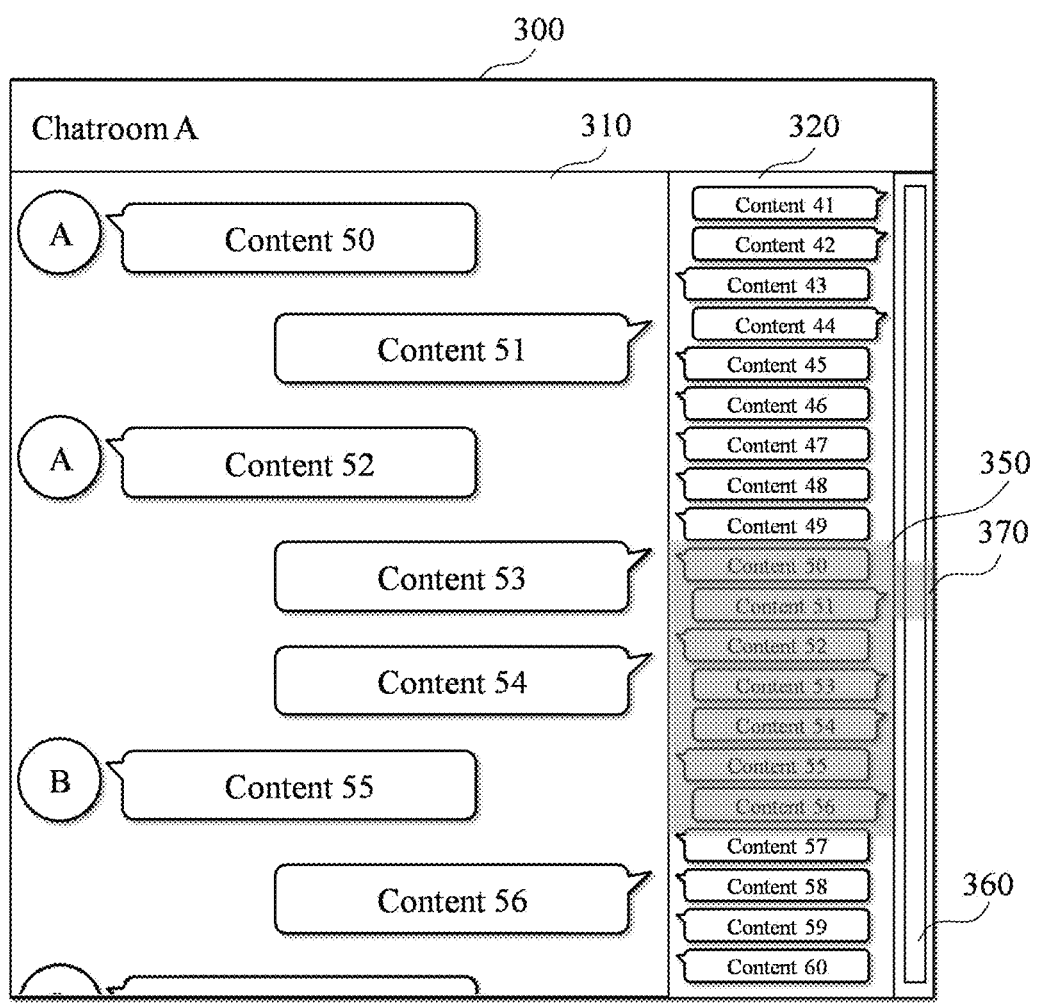

FIGS. 3 and 4 illustrate examples of a chatroom including a mini-map according to at least one example embodiment. Here, in the example embodiment of FIGS. 3 and 4, it is assumed that 100 instant messages are sent and received through a session corresponding to a chatroom A 300 and 100 contents ranging from content 1 to content 100 are present in association with the chatroom A 300.

The chatroom A 300 according to the example embodiment of FIGS. 3 and 4 may be implemented to include a first region 310 for displaying a portion of the contents and a second region 320 for displaying a mini-map. For example, in FIG. 3, the first region 310 displays content 31 to content 37 as a portion of the contents of instant messages sent and received through a session corresponding to the chatroom A 300. Also, the second region 320 may display the mini-map that includes content 27 to content 46 as a portion of the contents of the instant messages sent and received through the session corresponding to the chatroom A 300.

Meanwhile, the mini-map displayed on the second region 320 may display all of the contents of the instant messages sent and received through the session corresponding to the chatroom A 300 or may also display only a portion of the contents according to a number of contents as in the example embodiment of FIGS. 3 and 4. Here, the number of contents to be displayed at one time on the mini-map may be determined based on a size of each content, for example, the size of each content according to a length of text, a font size, or a size of an image included in each content. Here, the font size of text or the size of the image may be preset or may be set by a user through a separate setting function. Depending on some example embodiments, the computer apparatus 200 may change and thereby display an image in a form of a thumbnail and may also change and thereby display an image of a person or a place in a form of a specific icon. According to another example embodiment, the computer apparatus 200 may analyze and summarize content and may display the summarized content on the mini-map. According to another example embodiment, the computer apparatus 200 may distinguish contents according to a specific condition and thereby display the contents on the mini-map. For example, the computer apparatus 200 may distinguish contents by person that sends an instant message including corresponding content and thereby display the contents on the mini-map. As another example, the computer apparatus 200 may distinguish contents according to a time or a date at which each corresponding instant message is sent or received and thereby display the contents on the mini-map. As another example, the computer apparatus 200 may display content bookmarked by the user to be distinguished from other contents on the mini-map. To this end, the computer apparatus 200 may provide the user with a user interface for setting a condition for distinguishing contents and may distinguish contents according to the condition set through the user interface and thereby display the contents on the mini-map.

Here, content displayed on the first region 310 may be changed through a user input recognized for the first region 310, and content displayed through the mini-map of the second region 320 may be changed through the user input recognized for the second region 320. For example, contents displayed on the first region 310 or the second region 320 may be changed through a swipe touch gesture in an upward direction or a downward direction recognized for the first region 310 or the second region 320 in a touchscreen environment. Such change of contents may follow a sequence of contents. Referring to FIG. 3, double-headed arrows 330 and 340 may represent that contents to be displayed on the first region 310 and the second region 320 may be changed through the swipe touch gesture in the upward direction or the downward direction recognized for the first region 310 and the second region 320, respectively.

Also, referring to FIGS. 3 and 4, a first indicator 350 indicates contents on the mini-map corresponding to the contents displayed on the first region 310. When the contents displayed on the first region 310 are changed, the contents indicated on the mini-map by the first indicator 350 may be changed to correspond to the contents displayed on the first region 310. For example, when contents ranging from content 31 to content 37 displayed on the first region 310 of FIG. 3 are changed to contents ranging from content 50 to content 56 displayed on the first region 310 of FIG. 4 in response to a user input for the first region 310, contents displayed on the mini-map of the second region 320 may be changed from the contents ranging from content 31 to content 37 indicated on the second region 320 of FIG. 3 by the first indicator 350 to the contents ranging from content 50 to content 56 indicated on the second region 320 of FIG. 4 by the first indicator 350. Conversely, contents displayed on the second region 320 may be changed in response to a user input for the first indicator 350, for example, a touch-and-drag touch gesture in an upward direction or a downward direction relative to the first indictor 350 in a touchscreen environment. In this case, the contents indicated by the first indicator 350 may be changed and accordingly, contents to be displayed on the first region 310 may be changed to the contents indicated by the first indicator 350. As another example, when the user selects one of contents displayed on the mini-map of the second region 320, a portion of a sequence of contents including the selected content may be displayed on the first region 310. Even in this case, according to a sequence of contents displayed on the first region 310, contents to be displayed on the second region 320 and the first indicator 350 may be changed. That is, the contents to be displayed on the first region 310 and the contents indicated by the first indicator 350 may be dynamically changed to correspond to each other, and the contents to be displayed on the mini-map of the second region 320 may be dynamically changed based on the contents indicated by the first indicator 350.

Also, the second region 320 may include a bar 360 representing the entire sequence of contents of the chatroom A 300 and a second indicator 370 indicating a position on the bar 360 of the contents displayed on the first region 310. The user may search for contents by moving the second indicator 370, for example, by moving the second indicator 370 through a touch-and-drag touch gesture in an upward direction or a downward direction relative to the first indicator 350 in a touchscreen environment. Here, according to the movement of the second indicator 370, all of the contents displayed on the mini-map of the second region 320, the contents indicated by the first indicator 350, and the contents displayed on the first region 310 may be changed.

Figure 5:
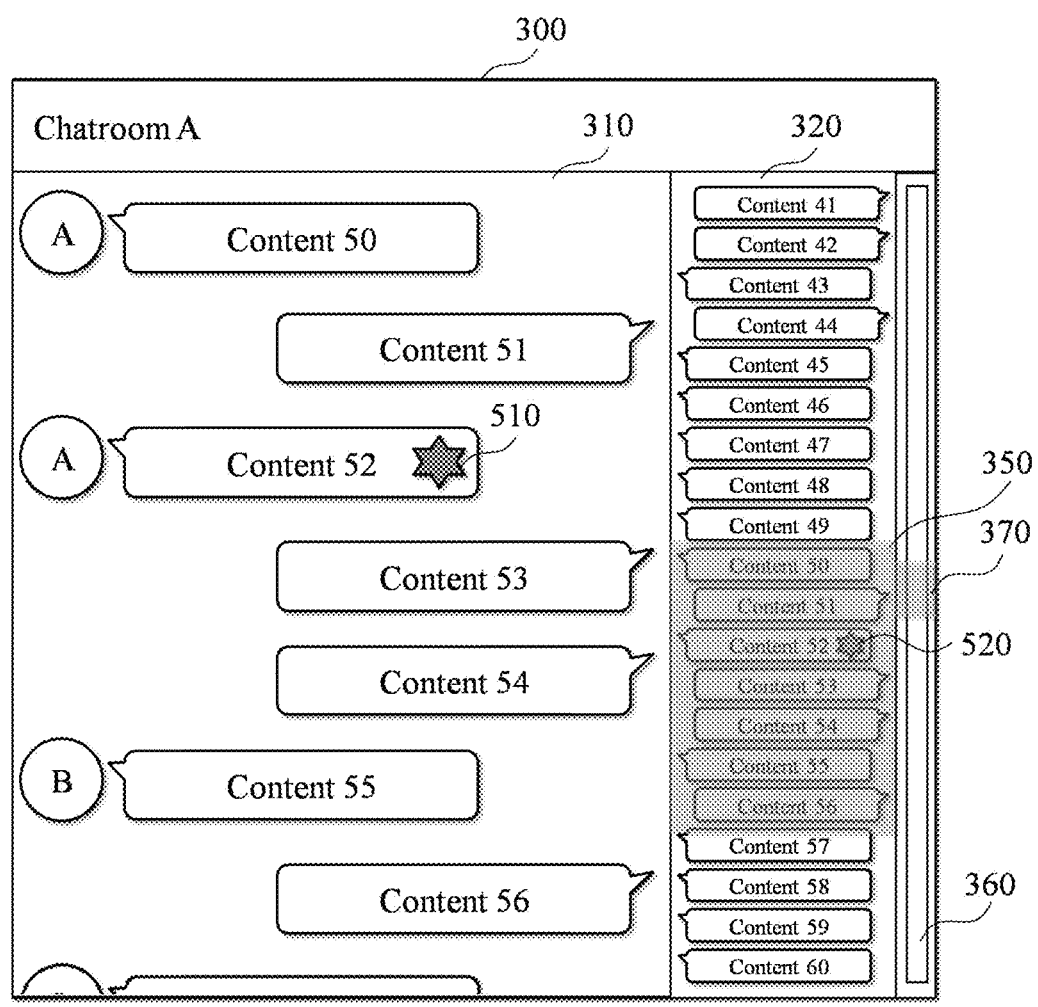
FIGS. 5 and 6 illustrate examples of a bookmark according to at least one example embodiment.
Figure 6:
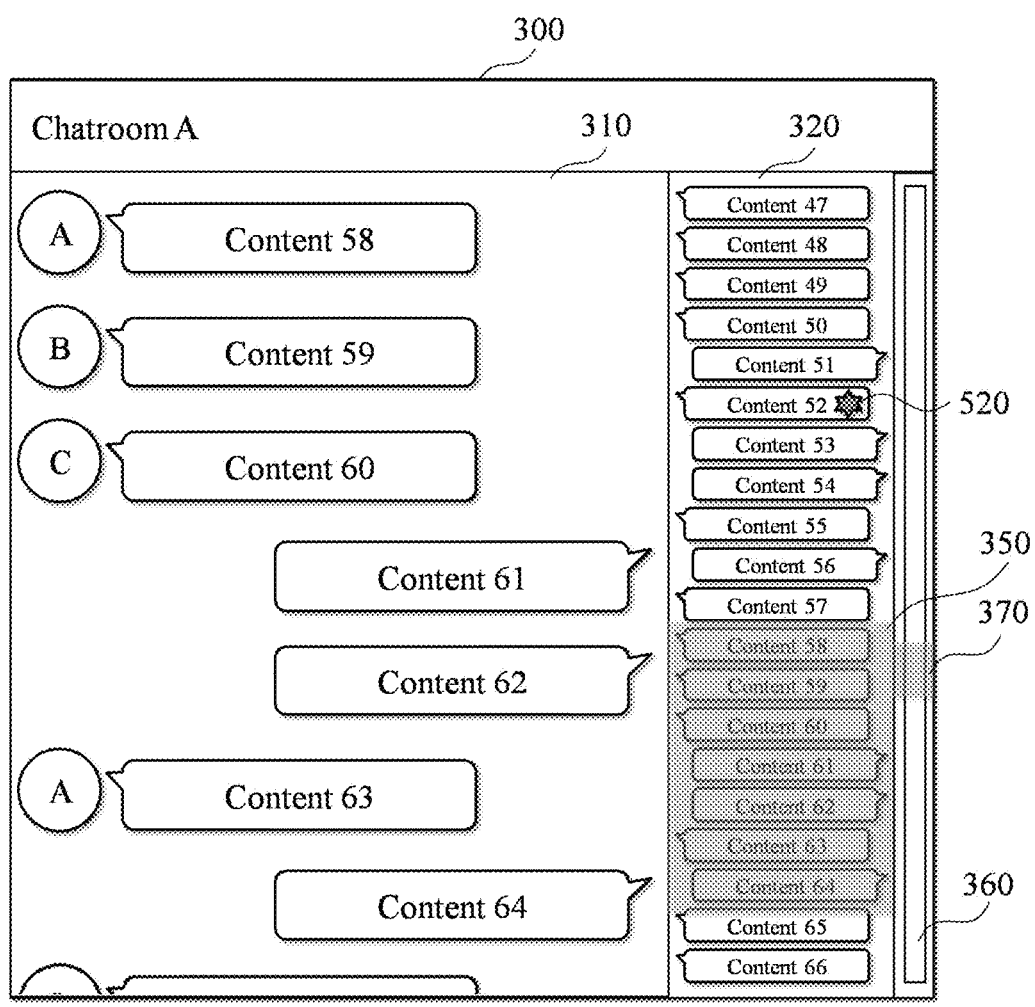

FIGS. 5 and 6 illustrate examples of a bookmark according to at least one example embodiment. FIG. 5 illustrates an example in which a bookmark 510 is set to content 52 among contents displayed on the first region 310 of the chatroom A 300. In this case, a bookmark 520 may be automatically set to content 52 on the mini-map of the second region 320 to correspond to the bookmark 510. Here, referring to FIG. 6, although contents displayed on the first region 310 is changed to content 58 to content 64 and content 52 is not displayed on the first region 310, the bookmark 520 is set to the content 52 displayed on the mini-map of the second region 320. In this case, the user may quickly search the entire contents for bookmarked contents through the mini-map of the second region 320.

Figure 7:
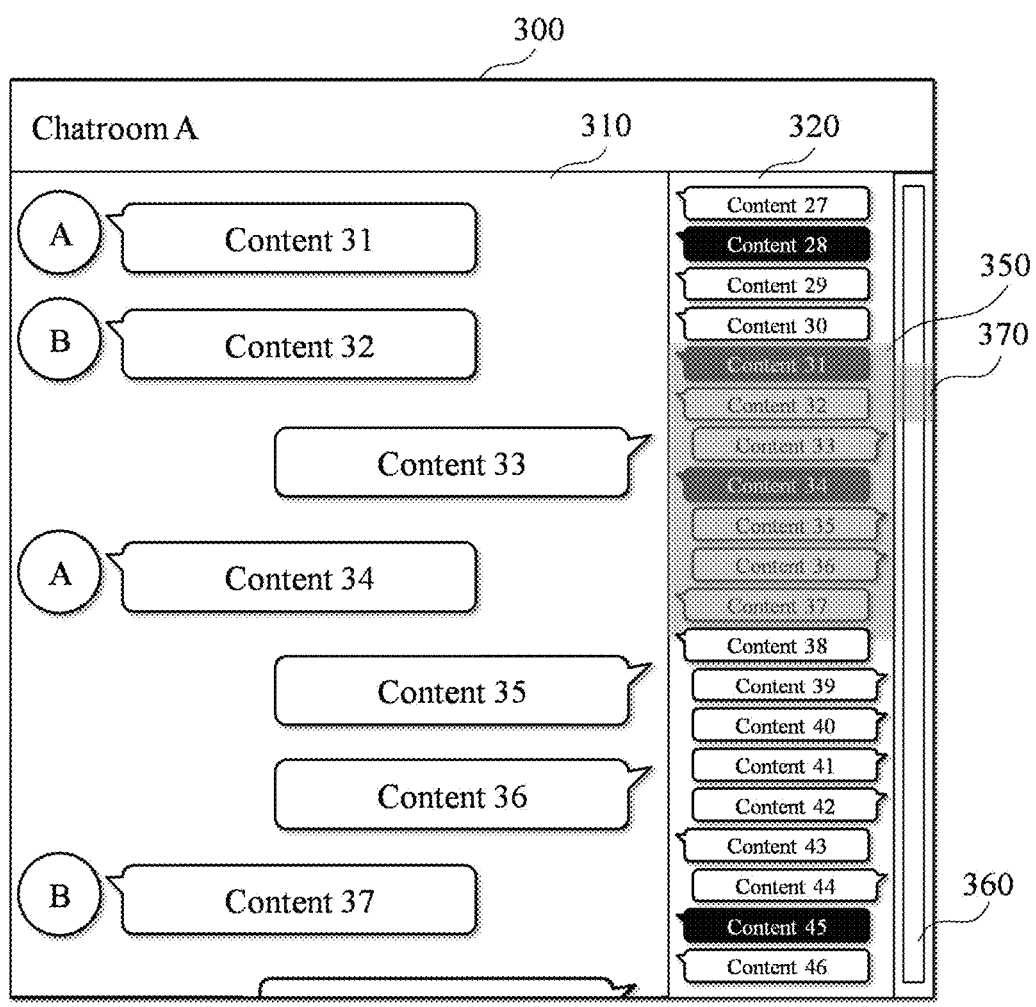
FIGS. 7 and 8 illustrate examples of distinguishing contents according to a set condition and thereby displaying the contents on a mini-map according to at least one example embodiment.
Figure 8:
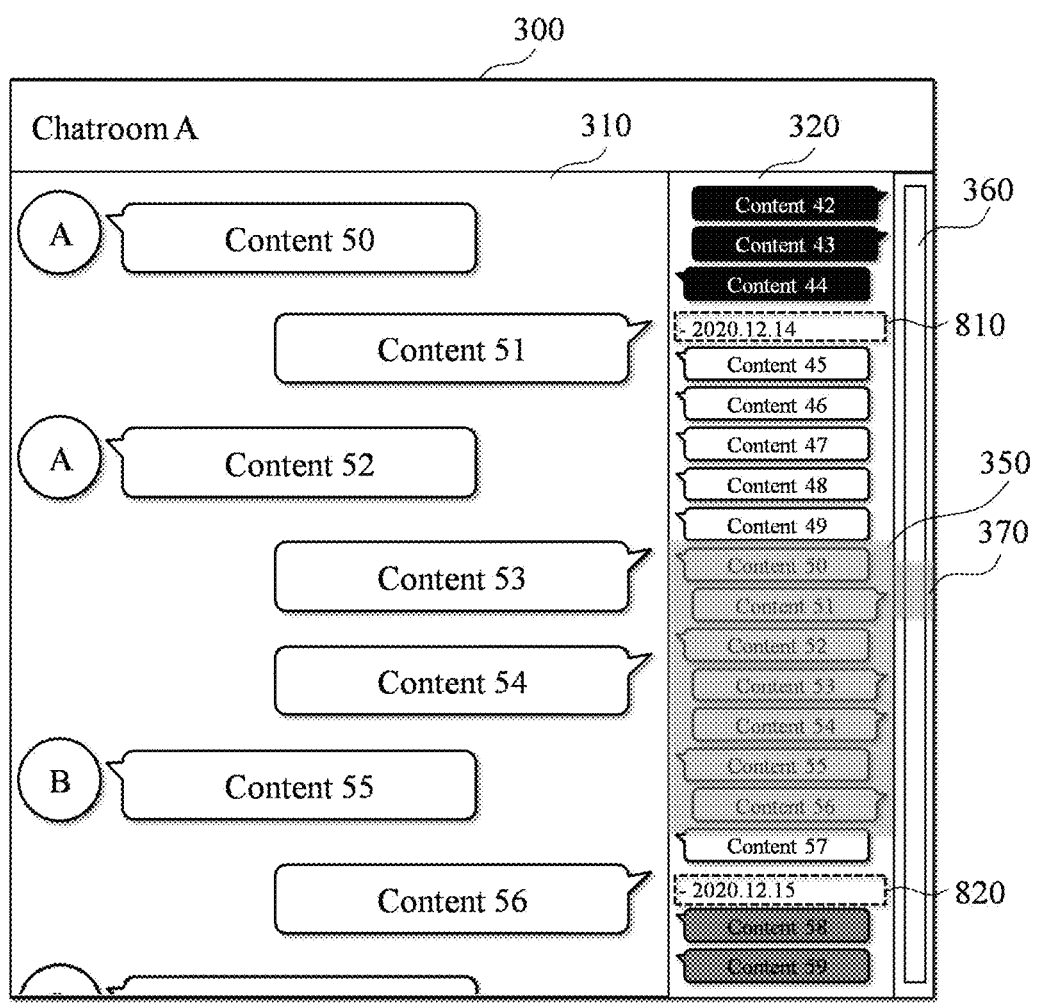

FIGS. 7 and 8 illustrate examples of distinguishing contents according to a set condition and thereby displaying the contents on a mini-map according to at least one example embodiment.

FIG. 7 illustrates an example in which the computer apparatus 200 displays contents (content 28, content 31, content 34, and content 45 in the example embodiment of FIG. 7) of instant messages sent from a user "A" to be distinguished from contents of instant messages sent from other users. In the example embodiment of FIG. 7, the computer apparatus 200 displays the contents of the instant messages sent from the user "A" using a color. However, it is provided as an example only. Content according to a specific condition may be displayed to be distinguished from other contents based on a size, a shape, etc., of the displayed content.

FIG. 8 illustrates an example in which the computer apparatus 200 distinguishes and thereby displays contents by date. In the example embodiment of FIG. 8, it is possible to easily verify that a date in which instant messages corresponding to content 42 to content 44 are sent, a date in which instant messages corresponding to content 45 to 57 are sent, and a date in which instant messages corresponding to content 58 and content 59 are sent are different from each other. Also, users may easily and quickly navigate contents of a desired date by indicating a corresponding date in which instant messages corresponding to the distinguished contents are sent using a first box 810 and a second box 820 each indicated with dotted lines in FIG. 8.

Although an example of distinguishing and thereby displaying contents according to a user or a date is described with reference to FIGS. 7 and 8, a content format may be used as a condition for distinguishing and thereby displaying contents depending on some example embodiments. Here, the content format may include, for example, a text, an image, a link, an emoticon, and a sticker. As another example embodiment, a user query may be used as the condition. For example, when the user inputs a text through a search interface of the chatroom A 300 or when a portion of texts displayed through the chatroom A 300 is selected, the computer apparatus 200 may distinguishably display content including the input or selected text on the mini-map of the second region 320.

Also, a condition of distinguishing and thereby displaying contents may be used as a condition of filtering contents.

Figure 9:
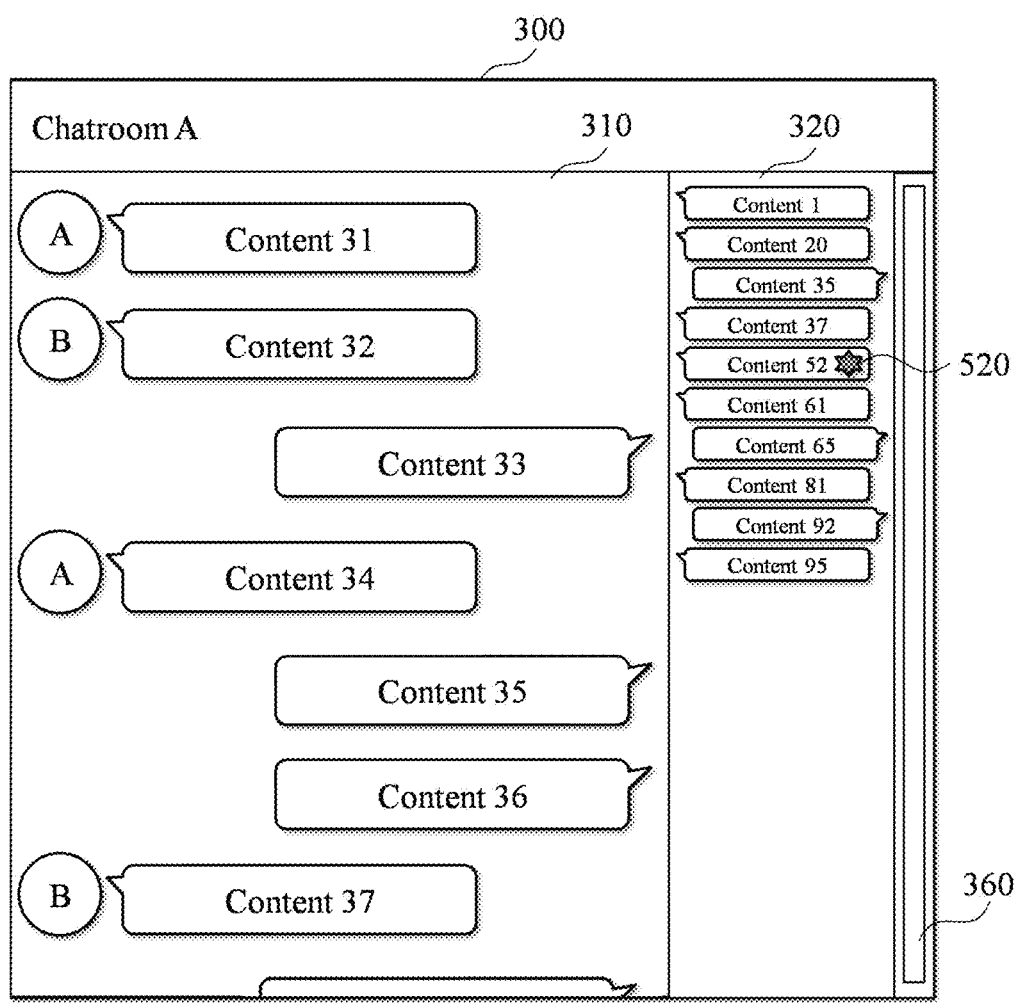
FIG. 9 illustrates an example of filtering contents according to a set condition and thereby displaying the filtered contents on a mini-map according to at least one example embodiment.

FIG. 9 illustrates an example of filtering contents according to a set condition and thereby displaying the filtered contents on a mini-map according to at least one example embodiment. FIG. 9 illustrates an example in which the computer apparatus 200 filters and thereby displays contents according to a content format. For example, in FIG. 9, contents in an image format may be filtered and thereby displayed through the mini-map of the second region 320. In this case, the user may quickly access content in the image format among contents included in instant messages sent and received in association with the chatroom A 300. For example, when the user selects content 95 from among the contents filtered and thereby displayed on the mini-map of the second region 320 of FIG. 9, a sequence of contents including content 95 may be displayed through the first region 310.

Meanwhile, although an example of filtering contents according to a content format is described with reference to FIG. 9, a date or a time, user information of a user that sends a message, and the like may be used as a content filtering condition.

Figure 10:
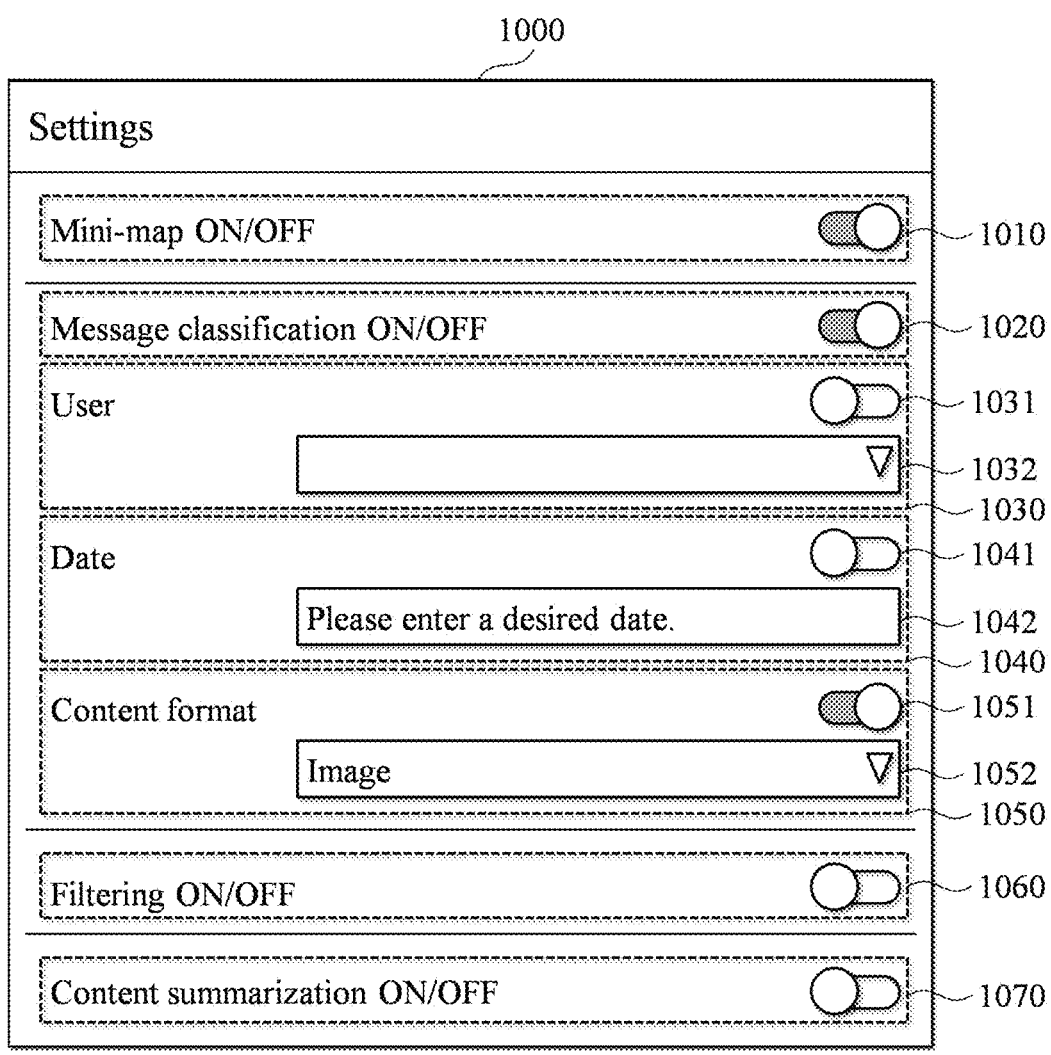
FIG. 10 illustrates an example of a user interface for setting a condition according to at least one example embodiment.

FIG. 10 illustrates an example of a user interface for setting a condition according to at least one example embodiment. A user interface 1000 of FIG. 10 represents an example of a setting screen for the chatroom A 300. The setting screen may be provided for each chatroom and/or may be collectively provided for all chatrooms.

A first box 1010 indicated with dotted lines represents an example of a selection button that allows the user to select whether to use a mini-map. If the mini-map is set to be used, the mini-map may be displayed as described above with reference to FIGS. 3 to 9. If the mini-map is set to not be used, the mini-map may not be displayed.

A second box 1020 indicated with dotted lines represents an example of a selection button for setting whether to use a function of distinguishing (or alternatively, discriminating or filtering) displaying content to be displayed.

Here, a third box 1030 indicated with dotted lines includes a selection button 1031 for selecting whether to distinguishably display content by user and a selection function 1032 for selecting a specific participant from among participants of the chatroom A 300. For example, the computer apparatus 200 may distinguishably display contents of selected participants of the chatroom A 300 on the mini-map according to a setting of the selection button 1031, and in response to a selection on a specific participant through the selection button 1032, the computer apparatus 200 may distinguishably display only content included in an instant message of the selected specific participant. Depending on some example embodiments, the computer apparatus 200 may display contents of the selected participants of the chatroom A 300 on the mini-map to be visually distinguishable, for example, using a color or a shape, for each participant according to a setting of the selection button 1031.

Also, a fourth box 1040 indicated with dotted lines includes a selection button 1041 for selecting whether to distinguishably display content by date and an input function 1042 for receiving an input of a specific date. For example, the computer apparatus 200 may distinguishably display contents of the mini-map by date according to a setting of the selection button 1041, and in response to a selection on a specific date (or, a date range, a specific time, and a time range) through the input function 1042, the computer apparatus 200 may distinguishably display only content included in instant messages sent and received on the selected date (or the date range, the specific time, and the time range). Depending on some example embodiments, the input function 1042 may provide an interface for selecting date (or the date range, the specific time, and the time range) in a form of a calendar.

A fifth box 1050 indicated with dotted lines includes a selection button 1051 for selecting whether to distinguishably display content according to a content format and a selection function 1052 for receiving a selection of a specific content format. For example, the computer apparatus 200 may display contents of the mini-map to be distinguished for each desired (or alternatively, predesignated) content format according to a setting of the selection button 1051 and may also distinguishably display only content in a specific content format selected through the selection function 1052.

A sixth box 1060 indicated with dotted lines represents an example of a selection button capable of setting whether to use a filtering function of filtering and thereby displaying contents. If the filtering function is set to be used, functions for setting a filtering condition similar to the third box 1030 to the fifth box 1050 each indicated with dotted lines may be provided.

A seventh box 1070 indicated with dotted lines represents an example of a selection button capable of selecting whether to use a content summarization function. In the case of using the content summarization function, the computer apparatus 200 may analyze and summarize content of an instant message directly or in association with a server that provides an instance messaging service and may display the summarized content through the mini-map.

Meanwhile, a display status may be automatically set to the mini-map based on a screen size of a user device, for example, the computer apparatus 200 or a size of a display region on which an instant message application is displayed within an application within a screen of the user device. For example, when a screen size or a size of the display region of the user device is less than or equal to a first threshold, the mini-map may not be displayed although the user is set a condition to use the mini-map. Similar thereto, a default value for a size of content displayed through the mini-map may be set based on the screen size of the user device. Also, content displayed on the mini-map according to the screen size of the user device may be modified. For example, when the screen size of the user device is less than or equal to a second threshold, content may be automatically filtered or modified and thereby displayed on the mini-map. For example, only bookmarked content, only contents of instant messages sent and received within a desired (or, alternatively, predetermined) time range, or summarized content may be displayed on the mini-map.

Also, a size of a second region on which the mini-map is displayed may be adjusted according to the screen size of the user device.

Also, depending on some example embodiments, the mini-map may be provided as a separate mini-map screen according to the screen size of the user device. For example, when the screen size of the user device is less than or equal to a third threshold, the chatroom A 300 may be provided as a separate mini-map screen by switching to a mini-map mode. Here, when the user selects specific content from among contents displayed on the mini-map screen, the mini-map screen may be switched again to the screen of the chatroom A 300 and a portion of a sequence of contents including the selected specific content may be displayed on the screen of the chatroom A 300.

Figure 11:
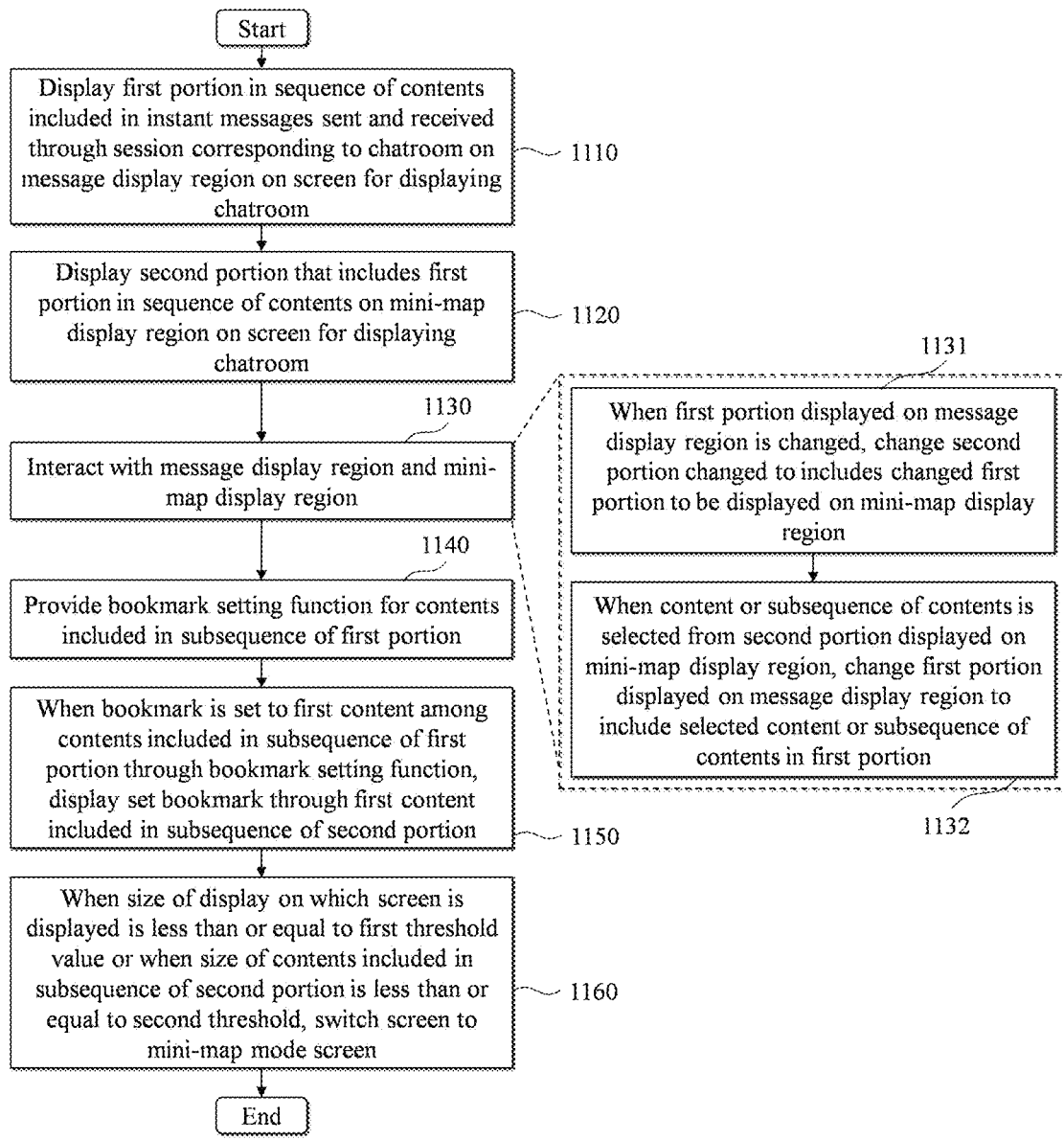
FIG. 11 is a flowchart illustrating an example of a mini-map providing method according to at least one example embodiment.

FIG. 11 is a flowchart illustrating an example of a mini-map providing method according to at least one example embodiment. The mini-map providing method may be performed by the computer apparatus 200. Here, the processor 220 of the computer apparatus 200 may be implemented to execute a control instruction according to a code of at least one computer program or a code of an OS included in the memory 210. Here, the processor 220 may control the computer apparatus 200 to perform operations 1110 to 1160 included in the method of FIG. 11 in response to the control instruction provided from the code stored in the computer apparatus 200.

In operation 1110, the computer apparatus 200 may display a first portion in a sequence of contents included in instant messages sent and received through a session corresponding to a chatroom on a message display region on a screen for displaying the chatroom. Here, the message display region may correspond to the first region 310 described above with reference to FIGS. 3 to 9. Although description is made based on an example of displaying contents in a form of a speech balloon with reference to FIGS. 3 to 9, a content display format is not limited to a speech balloon. The first portion displayed when a user enters the chatroom may include an end portion of the sequence of contents.

In operation 1120, the computer apparatus 200 may display a second portion that includes the first portion in the sequence of contents on a mini-map display region on the screen for displaying the chatroom. Here, for example, a size of each content included in a subsequence of the second portion may be set to be less than a size of each content included in a subsequence of the first portion. Here, the size of each content may include at least one of a length of text included in the content, a font size of text included in the content, and a size of an image included in the content. As another example, a number of contents included in a first subsequence of the second portion may be greater than a number of contents included in a second subsequence of the first portion. The mini-map is to navigate contents of instant messages sent and received through a session corresponding to the chatroom and a number of contents displayed on the mini-map display region may be set to be greater than the number of contents displayed on the message display region, but a size of each content displayed on the mini-map display area may be set to be smaller than a size of each content displayed on the message display region. The number or the size of contents may be directly set by the user or may be automatically set according to a size of a display on which the screen is displayed.

For example, in operation 1120, the computer apparatus 200 may modify the contents included in the subsequence of the second portion. Here, modification of contents may be performed according to a setting of the user or the size of the display. As an example of modifying the contents, the computer apparatus 200 may reduce at least one of a font size and an image size of contents included in the subsequence of the second portion. As another example, the computer apparatus 200 may replace an image with an icon or may summarize a text and replace the text with the summarized text, in the contents included in the subsequence of the second portion. As another example, the computer apparatus 200 may replace the contents included in the subsequence of the second portion with bookmarked contents or a sequence of times at which instant messages corresponding to the contents are sent and received.

In operation 1130, the computer apparatus 200 may interact with the message display region and the mini-map display region. For this interaction, operation 1130 may include operations 1131 and 1132.

In operation 1131, when the first portion displayed on the message display region is changed, the computer apparatus 200 may change the second portion changed to include the changed first portion to be displayed on the mini-map display region. For example, in response to a change from a first subsequence (e.g., content 31 to content 37) of contents displayed on the first region 310 corresponding to the message display region to a second subsequence (e.g., content 50 to content 56), changing a third subsequence (e.g., content 27 to content 46) of contents displayed on the second region 320 corresponding to the mini-map display region to a fourth subsequence (e.g., content 41 to content 60) is described above with reference to FIGS. 3 and 4. Here, that the changed fourth subsequence includes the changed second subsequence may be verified.

In operation 1132, when content or a subsequence of contents is selected from the second portion displayed on the mini-map display region, the computer apparatus 200 may change the first portion displayed on the message display region to include the selected content or subsequence of contents in the first portion. Also, as described above with reference to FIGS. 3 and 4, when the contents displayed on the second region 320 are changed in response to a user input for the first indicator 350, the contents indicated by the first indicator 350 may be changed and accordingly, contents to be displayed on the first region 310 may be changed to the contents indicated by the first indicator 350. Also, as described above with reference to FIGS. 3 and 4, when the user selects one of the contents displayed on the mini-map of the second region 320, a portion of a sequence of contents including the selected content may be displayed on the first region 310.

Meanwhile, the computer apparatus 200 may set a condition for at least one of a sending time range of an instant message, a sender of the instant message, and a content format. Here, the computer apparatus 200 may distinguish contents included in the subsequence of the second portion according to the set condition and thereby display the contents on the mini-map display region. For example, an example of distinguishably displaying content of an instant message sent from a specific sender is described with reference to FIG. 7 and an example of distinguishably displaying contents by date on which a corresponding instant message is sent is described with reference to FIG. 8.

Also, the computer apparatus 200 may set a condition for at least one of a sending time range of an instant message, a sender of the instant message, and a content format. Here, the computer apparatus 200 may filter contents included in the subsequence of the second portion according to the set condition and thereby display the contents on the mini-map display region. For example, an example of filtering contents that include an image and thereby displaying the filtered contents on the mini-map display region is described with reference to FIG. 9.

To this end, the computer apparatus 200 may provide a user interface for setting a condition and may register the condition selected or input through the user interface as a setting value. Here, a condition for distinguishing contents and a condition for filtering contents may be individually set. An example of the user interface 1000 for setting the condition is described above with reference to FIG. 10.

In operation 1140, the computer apparatus 200 may provide a bookmark setting function for contents included in a subsequence of the first portion. For example, in response to a selection from the user on each of contents displayed on the message display region, the computer apparatus 200 may provide a function for bookmarking the selected content to the user.

In operation 1150, when a bookmark is set to first content among the contents included in the subsequence of the first portion through the bookmark setting function, the computer apparatus 200 may display the set bookmark through the first content included in the subsequence of the second portion. That is, a bookmark of specific content set in the message display region may be displayed in association with the specific content on the mini-map display region when displaying the specific content on the mini-map display region. When corresponding content is not displayed on the message display region and is displayed on the mini-map display region, the bookmark may be displayed in association with the corresponding content on the mini-map display region.

In operation 1160, when a size of a display on which the screen is displayed is less than or equal to a first threshold or when a size of each content included in the subsequence of the second portion is less than or equal to a second threshold, the computer apparatus 200 may switch the screen to a mini-map mode screen. Here, the contents included in the subsequence of the second portion may be displayed on the mini-map mode screen. That is, when the size of the display is too small, for example, less than or equal to the first threshold value, or when the size of contents of the mini-map is too small for the user to recognize, the computer apparatus 200 may switch the screen to the mini-map mode screen such that the mini-map may be displayed on the screen without displaying a screen for the chatroom.

When the user enters the chatroom, the computer apparatus 200 may initially display the mini-map mode screen on which the contents included in the subsequence of the second portion are displayed. Here, when a desired (or alternatively, preset) period of time elapses or when at least one of the contents displayed on the mini-map mode screen is selected by the user, the computer apparatus 200 may display the screen on which a selected content is displayed and including the message display region and the mini-map display region. That is, the computer apparatus 200 may initially display the mini-map mode screen to facilitate navigating of the user and, when the desired (or alternatively, preset) period of time is elapses or when the user selects specific content, may display the screen on which the selected content is displayed and including the message display region and the mini-map display region.

According to some example embodiments, it is possible to provide a mini-map for contents of instant messages sent and received through a session corresponding to a chatroom.

By providing a mini-map for content of instant messages, the methods and/or systems according to some example embodiments enable a user to quickly locate and ascertain contents of his/her interest in the message display region, reducing a user's scrolling effort or filtering effort through the plurality of instant messages exchanged in the chatroom. Accordingly, computing/processing resources of a computer apparatus may be used less, thereby reducing power consumption associated therewith.

The systems or the apparatuses described above may be implemented using hardware components, and/or a combination of hardware components and software components. For example, a processing device (e.g., processor) and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A mini-map providing method performed by a computer apparatus comprising at least one processor, the mini-map providing method comprising:
   displaying, by the at least one processor, a first portion in a sequence of contents included in instant messages sent and received through a session corresponding to a chatroom on a message display region on a screen for displaying the chatroom;
   displaying, by the at least one processor, a second portion in the sequence of contents on a mini-map display region on the screen for displaying the chatroom, a sequence of contents included in the second portion including a set of contents including a sequence of contents included in the first portion in an abridged manner; and
   interacting, by the at least one processor, with the message display region and the mini-map display region,
   wherein a size of each content included in a subsequence of the second portion is less than a size of each content included in a subsequence of the first portion.

2. The mini-map providing method of claim 1, wherein the size of each content includes at least one of a length of text included in content, a font size of text included in the content, and a size of an image included in the content.

3. The mini-map providing method of claim 1, wherein a number of contents included in a first subsequence of the second portion is greater than a number of contents included in a second subsequence of the first portion.

4. The mini-map providing method of claim 1, wherein the displaying on the mini-map display region comprises modifying contents included in the subsequence of the second portion.

5. The mini-map providing method of claim 4, further comprising:
   displaying, by the at least one processor, a size of a display on which the screen is displayed,
   wherein the modifying comprises modifying the contents included in the subsequence of the second portion according to the size of the display.

6. The mini-map providing method of claim 4, wherein the modifying comprises reducing at least one of a font size and an image size of respective contents included in the subsequence of the second portion.

7. The mini-map providing method of claim 4, wherein the modifying comprises (1) replacing an image with an icon or (2) summarizing a text and replacing the text with the summarized text, in the contents included in the subsequence of the second portion.

8. The mini-map providing method of claim 4, wherein the modifying comprises replacing contents included in the subsequence of the second portion with bookmarked contents or replacing the contents included in the subsequence of the second portion with a sequence of times at which instant messages corresponding to the contents are sent and received.

9. The mini-map providing method of claim 1, further comprising:
   providing, by the at least one processor, a bookmark setting function for contents included in the subsequence of the first portion; and
   in response to setting a bookmark to first content among the contents included in the subsequence of the first portion through the bookmark setting function, displaying the set bookmark through the first content included in the subsequence of the second portion.

10. The mini-map providing method of claim 1, wherein the displaying a second portion comprises:
setting a condition for at least one of a sending time range of an instant message, a sender of the instant message, and a content format; and
distinguishing contents included in the subsequence of the second portion according to the set condition and displaying the distinguished contents on the mini-map display region.

11. The mini-map providing method of claim 1, wherein the displaying a second portion comprises:
setting a condition for at least one of a sending time range of an instant message, a sender of the instant message, and a content format; and
filtering contents included in the subsequence of the second portion according to the set condition and displaying the filtered contents on the mini-map display region.

12. The mini-map providing method of claim 10, further comprising:
providing, by the at least one processor, a user interface for setting the condition,
wherein the setting of the condition comprises registering the condition selected or input through the user interface as a setting value.

13. The mini-map providing method of claim 1, further comprising:
switching, by the at least one processor, the screen to a mini-map mode screen in response to a size of a display on which the screen is displayed being less than or equal to a first threshold or in response to a size of each content included in a—the subsequence of the second portion being less than or equal to a second threshold,
wherein the contents included in the subsequence of the second portion are displayed on the mini-map mode screen.

14. The mini-map providing method of claim 1, further comprising:
displaying, by the at least one processor, a mini-map mode screen on which contents included in the subsequence of the second portion are displayed in response to a user entering the chatroom; and
displaying, by the at least one processor, the screen on which a selected content is displayed and including the message display region and the mini-map display region in response to an elapse of a period of time or in response to a selection of at least one of the contents displayed on the mini-map mode screen by the user.

15. A non-transitory computer-readable record medium storing a program, which when executed by at least one processor included in a computer apparatus, causes the computer apparatus to perform the mini-map providing method of claim 1.

16. A mini-map providing method performed by a computer apparatus comprising at least one processor, the mini-map providing method comprising:
displaying, by the at least one processor, a first portion in a sequence of contents included in instant messages sent and received through a session corresponding to a chatroom on a message display region on a screen for displaying the chatroom;
displaying, by the at least one processor, a second portion in the sequence of contents on a mini-map display region on the screen for displaying the chatroom, a sequence of contents included in the second portion including a set of contents including a sequence of contents included in the first portion in an abridged manner; and
interacting, by the at least one processor, with the message display region and the mini-map display region,
wherein the interacting comprises,
in response to changing the first portion displayed on the message display region, changing the second portion to include the changed first portion to be displayed on the mini-map display region, and
in response to selecting a specific content or a subsequence of contents from the second portion displayed on the mini-map display region, changing the first portion displayed on the message display region to include the selected content or subsequence of contents in the first portion.

17. A computer apparatus comprising:
at least one processor configured to execute a computer-readable instruction,
wherein the at least one processor is configured to cause the computer apparatus to,
display a first portion in a sequence of contents included in instant messages sent and received through a session corresponding to a chatroom on a message display region of a screen for displaying the chatroom,
display a second portion in the sequence of contents on a mini-map display region on the screen for displaying the chatroom, a sequence of contents included in the second portion including a set of contents including to a sequence of contents included in the first portion in an abridged manner, and
interact with the message display region and the mini-map display region,
wherein a size of each content included in a subsequence of the second portion is less than a size of each content included in a subsequence of the first portion.

18. The computer apparatus of claim 17, wherein the at least one processor is configured to interact with the message display region and the mini-map display region by,
in response to changing the first portion displayed on the message display region, changing the second portion to include the changed first portion to be displayed on the mini-map display region, and
in response to selecting content or a subsequence of contents from the second portion displayed on the mini-map display region, changing the first portion displayed on the message display region to include the selected content or subsequence of contents in the first portion.

* * * * *